United States Patent

[11] 3,596,456

[72] Inventor Graeme R. Quick
 Ames, Iowa
[21] Appl. No. 753,553
[22] Filed Aug. 19, 1968
[45] Patented Aug. 3, 1971
[73] Assignees Iowa State University Research Foundation
 Ames, Iowa

[54] STRAWBERRY-HARVESTING DEVICE
 4 Claims, 6 Drawing Figs.
[52] U.S. Cl. .................................................. 56/330
[51] Int. Cl. ............................................. A01g 19/00
[50] Field of Search ........................................... 56/330,
 126—130

[56] References Cited
 UNITED STATES PATENTS
2,037,624 4/1936 Franklin ..................... 56/330

| 1,233,089 | 7/1917 | Maglathlin | 56/330 |
| 1,572,025 | 2/1926 | Maglathlin | 56/330 |
| 2,429,471 | 1/1949 | Tebbetts | 56/330 |
| 2,671,301 | 3/1954 | Harrison | 56/330 |

Primary Examiner—Louis G. Mancene
Assistant Examiner—J. A. Oliff
Attorney—Zarley, Mc Kee & Thomte ABSTRACT: A device for harvesting strawberries including a pickup unit having spaced-apart teeth and a roller extending thereunder and being connected to a vibration means for imparting arcuate vibratory motion to the pickup unit for gathering, stripping and conveying strawberries to a collecting unit. A platform may extend between the pickup unit and a cross conveyor in communication with the collecting unit and forced air may be directed from the pickup unit along the platform rearwardly to provide an air elevator for the berries and also separate the foreign material therefrom.

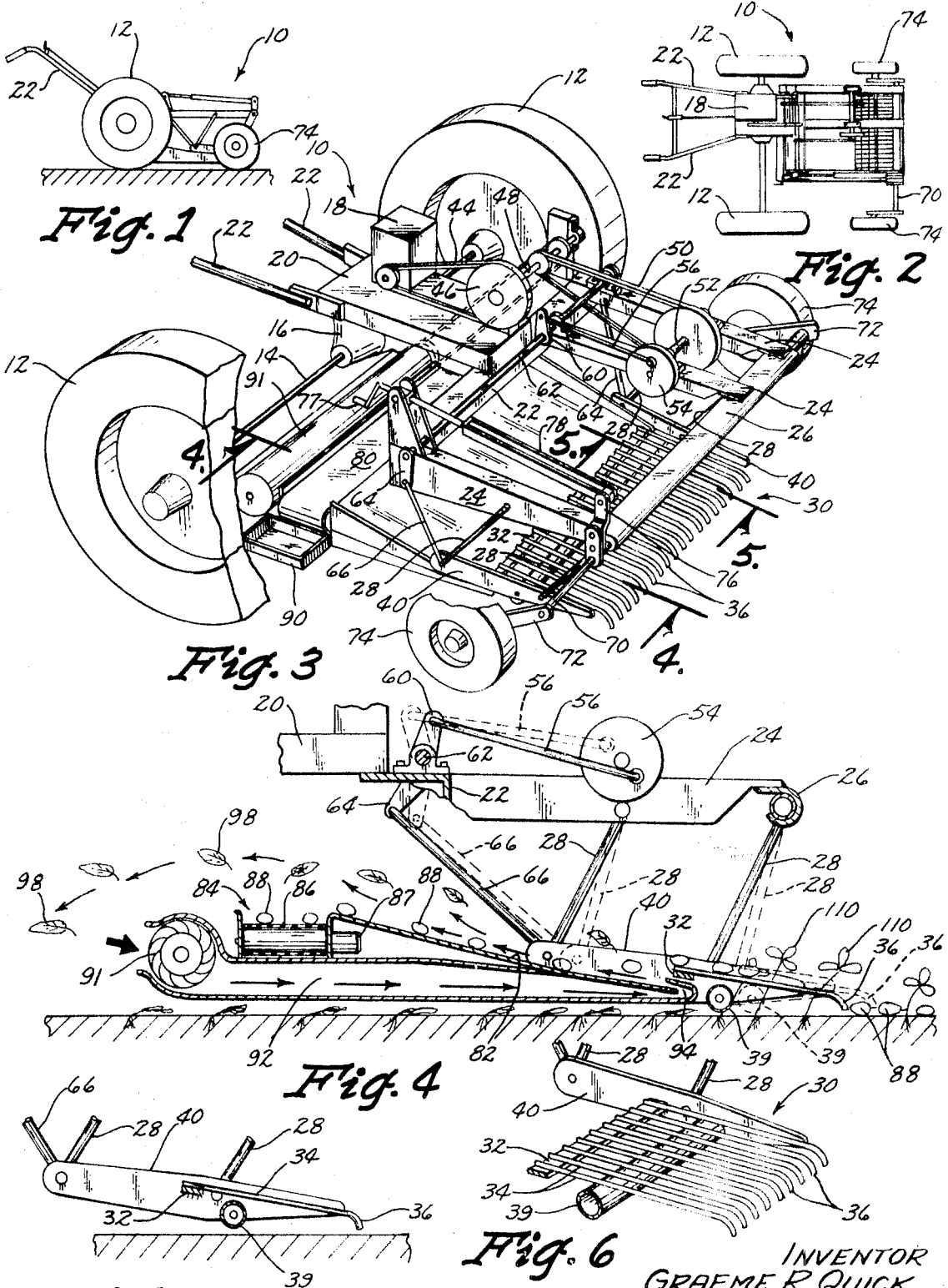

STRAWBERRY-HARVESTING DEVICE

The mechanical picking of strawberries to be satisfactory must harvest a sufficiently high percentage of the ripe berries with a minimum of damage to the berries. The machine must be able to follow ground irregularities and gather the berries without becoming clogged with foreign matter. The pickup unit should be sensitive to size of the berries and thus pass over those which are too small.

The harvesting device of this invention employs spaced-apart teeth which lift and comb out and strip the berries, particularly as the stems meet the roller beneath the comb where the stems are pulled down by the normal advance of the machine and the superimposed vibrating action of the comb and the roller. The tooth action is the same as that of a jog conveyor and thus the ripened berries tend to be vibrated back along the teeth to the collecting tray or elevator.

An air elevator has been provided which is mounted directly behind and below the rear of the teeth and employs a rearward facing nozzle and diffuser where the air from a fan is ejected over a sloping platform at sufficient speed to convey the crop up to a cross conveyor. The cross conveyor moves in a trough and the careful shaping of the trough and the angle of the platform relative to the trough will cause the berries to drop out of the airstream into the trough while leaves and any mulch picked up continues on over and out with the airstream thus removing foreign matter from the harvest.

The forward speed of the harvesting device may vary as high as 2 ½ miles per hour with an optimum speed of 0.85 m.p.h. The pickup unit includes a 20-inch-wide row of 5/16 inch steel rod teeth spaced 0.4 inches apart and 8 inches long and have a slightly hooked nose portion extending downwardly. A 1 ¼-inch-diameter steel roller is mounted on the same subassembly frame.

These and other features and advantages of this invention will become readily apparent to those skilled in the art upon reference to the following description when taken into consideration with the accompanying drawings, wherein:

FIG. 1 is a side perspective view of the harvesting device;

FIG. 2 is a top plan view of the device;

FIG. 3 is a fragmentary perspective view of the harvesting device;

FIG. 4 is a cross-sectional view taken along line 4-4 in FIG. 3;

FIG. 5 is a cross-sectional view taken along line 5-5 in FIG. 3; and

FIG. 6 is a perspective fragmentary view of the pickup comb teeth and roller.

The strawberry-harvesting device of this invention is generally referred to in FIG. 1 by the reference numeral 10 and includes a pair of large rear drive wheels 12 on an axle 14 connected to a drive gear box 16 in turn powered by an internal combustion engine 18 through a drive mechanism (not shown) extending down through the engine support 20.

A pair of handle members 22 extend rearwardly from the engine support 20 for operation by the operator of the harvesting device. The platform 20 is connected at its forward end to the rear transversely extending cross frame member 22 having forwardly extending side frame members 24 interconnected at their forward ends by a forward crossmember 26.

At opposite sides of the harvesting device a pair of parallel support rods 28 pivotally extend downwardly and pivotally engage a pickup unit 30 having a rigid transversely extending crosspiece 32 with forwardly extending teeth 34 which are spaced 0.4 inches apart and 8 inches long and are formed of 5/16-inch steel rod. As shown, the pickup unit is 20 inches wide. A slightly hooked downwardly nose portion 36 is provided on the forward end of the rod teeth.

A 1 ¼-inch-diameter steel roller 39 is freely rotatable and mounted on and between the side members 40 on opposite sides of the teeth 34 such that the teeth 34 and the roller move as a unit. It is noted that the roller 39 is positioned rearwardly of the forward ends 36 on the teeth 34 at a position such that the teeth will function as a comb to lift the berries and strip them from the stems as the stems are pulled down by the normal advance of the machine and the superimposed vibrating action hereinafter discussed.

The vibrating action of the pickup unit 30 is accomplished through a drive belt 44 connected to the engine 18 because it is connected to a pulley 46 on a shaft 48 which drives a belt 50 connected to a shaft 52 which carries an eccentric disc 54. A rod 56 is connected at a point off the rotational axis of the disc 54 and in turn extends rearwardly for pivotal connection to an upstanding post 60 carried on a shaft 62 extending between the side frame members 24. At opposite ends of the shaft 62 are downwardly extending arms 64 which are pivotally connected to rods 66 pivotally connected to the lower side frame members 40 and thus provide the vibratory movement for the pickup unit 30.

The cross frame member 26 includes a shaft 70 having downwardly and rearwardly extending wheel support arms 72 with depth gage wheels 74 carried thereon. The shaft 70 also carries an upstanding post 76 coupled to a screw adjustment means 78 mounted on top of the side frame member 24 as seen in FIG. 3. A hand-operated adjustment screw 77 is provided to selectively lower and raise the pickup unit 30 by moving the depth wheels 74 rearwardly and forwardly respectively.

The pickup unit 30 conveys the berries rearwardly in the same manner as a jog conveyor as it is oscillated and vibrated as the harvesting unit moves forwardly. The berries are deposited on a platform 82 which extends rearwardly and upwardly where it terminates with a trough 84 having a cross-belt conveyor 86 moving therein. A hydraulic motor 87 is provided for driving the belt conveyor 86 and feeds the berries 88 to a collecting box 90 as seen in FIG. 3.

A fan 91 rearwardly of the belt conveyor 86 is provided to transmit air through a chamber 92 which nozzles the air at the forward end of the platform 82 adjacent the rear ends of the teeth 34 onto and along the platform 82 rearwardly thereof to provide an air elevator for movement of the berries 88 rearwardly along with leaves 98 and other foreign matter. It is seen that the air passing through the nozzle 94 is of such an intensity that it will blow the berries onto the cross conveyor 86 and blow the foreign material across the conveyor 86 and thus serve to convey the berries from the pickup unit 30 to the cross conveyor 86 and clean them at the same time. The bruising of the berries will be minimized by this conveying action.

In operation the pickup unit 30 is suspended by the four inclined parallel arms 28 and vibrated in a motion parallel to the ground and upwardly and rearward from the extreme forward position to give an arcuate path of movement. Optimum length of stroke and speed of vibration are on the order of five-eighths inches and 1,000 cycles per minute respectively. The optimum speed of forward movement of the harvesting device is 0.85 m.p.h. The narrower the width of the pickup unit 30 the more effective the pickup of the berries will be since the pickup unit will more closely follow the curvature of the ground and not be subject to irregularities which would tend to raise the pickup unit and cause the teeth 34 to miss and pass over the berries. A width of 20 to 24 inches is suggested and will easily receive rows of crop 18 inches in width. The spacing of the teeth 34 0.4 inches apart will pick up all berries three-eighth inches in size and larger and thus the unit is selective by size of the berries rather than by maturity of the crop.

It is observed from FIGS. 4, 5 and 6 that the downwardly projecting hooked ends 36 of the teeth 34 tend to lift the berries 88 on the ground upwardly over the convex surface of the teeth onto the center body portions thereof and separate them from the plants 110 when the plants engage the rollers 39 as the machine advances forwardly. The rod teeth are rigid and thus will not bury themselves in the ground should they engage any irregularity.

It is to be understood that while this harvesting machine is most effective in operation for harvesting strawberries it may also be used for harvesting other crops including cotton, potatoes, peanuts, capsicum, with minor modifications and therefore the use of the expression strawberries is not to be considered limiting. Some changes may be made in the construction and arrangement of my STRAWBERRY-HARVESTING DEVICE without departing from the real spirit and purpose of my invention, and it is my intention to cover by my claims, any modified forms of structure or use of mechanical equivalents which may be reasonably included within their scope.

I claim:
1. A strawberry-harvesting device, comprising,
a frame having forward and rearward ends with respect to the normal harvesting direction of travel,
a crop pickup unit at the forward end of said frame and having forward and rearward ends with respect to said normal harvesting direction of travel,
a berry collection means on said frame,
a conveying means for transferring said berries from said pickup unit to said collection means,
said pickup unit including a plurality of teeth spaced apart transversely of the harvesting direction of travel of said device,
said frame including first and second frame members disposed at opposite sides of said pickup unit and being positioned thereabove, at least a first pair of spaced-apart parallel support arms pivotally connected at their upper ends to said first frame member and pivotally connected at their lower ends to one side of said pickup unit, at least a second pair of spaced-apart parallel support arms pivotally connected at their upper ends to said second frame member and pivotally connected at their lower ends to the other side of said pickup unit, said support arms extending downwardly and rearwardly from their upper ends to their lower ends,
said pickup unit being movable upwardly and rearwardly from a forward position with respect to said direction of travel, to define an arcuate path of movement,
and power means connected to said pickup unit for reciprocating said pickup unit about the pivotal axes of the upper ends of said support arms so that said pickup unit is vibrated rearwardly and upwardly from said forward position whereby said strawberries are lifted, detached from the plant and conveyed rearwardly along said teeth.

2. The structure of claim 1 wherein said pickup unit includes a roller positioned below said teeth and rearwardly of the forward end of said teeth, said power means being operatively connected to said pickup unit to impart arcuate vibrating motion to said roller whereby said strawberries are lifted, detached from the plant and conveyed rearwardly along said teeth simultaneously with the separation of said strawberries from associated foreign materials, said roller and teeth being integrally connected to vibrate together as a unit.

3. The structure of claim 1 wherein a platform extends upwardly and rearwardly from the rearward ends of said teeth, an air nozzle means at the forward end of said platform, a fan means for supplying forced air to said air nozzle means whereby air will be directed rearwardly over said platform at least initially in a parallel relationship with respect thereto to convey the strawberries rearwardly therealong.

4. The structure of claim 1 wherein said teeth have downwardly and forwardly extending hook-shaped forward ends.